No. 840,107.  
PATENTED JAN. 1, 1907.  
T. R. BRITTAIN.  
CLAY MILL.  
APPLICATION FILED APR. 25, 1906.

Witnesses,  
Edna Bortz  
Glenara Fox

Inventor:  
T. R. Brittain,  
by C. E. Humphrey,  
Atty.

UNITED STATES PATENT OFFICE.

THOMAS R. BRITTAIN, OF AKRON, OHIO.

CLAY-MILL.

No. 840,107.  Specification of Letters Patent.  Patented Jan. 1, 1907.

Application filed April 25, 1906. Serial No. 313,615.

*To all whom it may concern:*

Be it known that I, THOMAS RENO BRITTAIN, a citizen of the United States, residing at Akron, in the county of Summit and State of Ohio, have invented new and useful Improvements in Clay-Mills, of which the following is a specification.

This invention relates to machines for preparing clay for use in the manufacture of earthenware products, such as sewer-pipe, jugs, crocks, &c.

The objects of this invention are to provide a machine into which the clay to be prepared is forced in a watery solution and from which it will emerge in a thick plastic stream ready for use in other machines which shape it. This machine is designed to properly prepare the clay by agitation and extraction of the surplus moisture therefrom as contradistinguished from that type of machine wherein the clay is mixed with a limited amount of water and ground under continuously-acting grinding-wheels.

The object of this invention is to prepare a machine which will receive the clay in a watery solution, properly disintegrate and temper and deliver the same therefrom in a continuous thick plastic stream ready for use in presses for shaping it.

With the foregoing and other objects in view the invention consists in the novel construction, combination, and arrangement of parts constituting the invention to be hereinafter referred to, and illustrated in the accompanying drawings, which form a part of this specification, in which is shown the preferred embodiment of the invention; but it is to be understood that changes, variations, and modifications can be resorted to which come within the scope of the claims hereunto appended.

Figure 1:
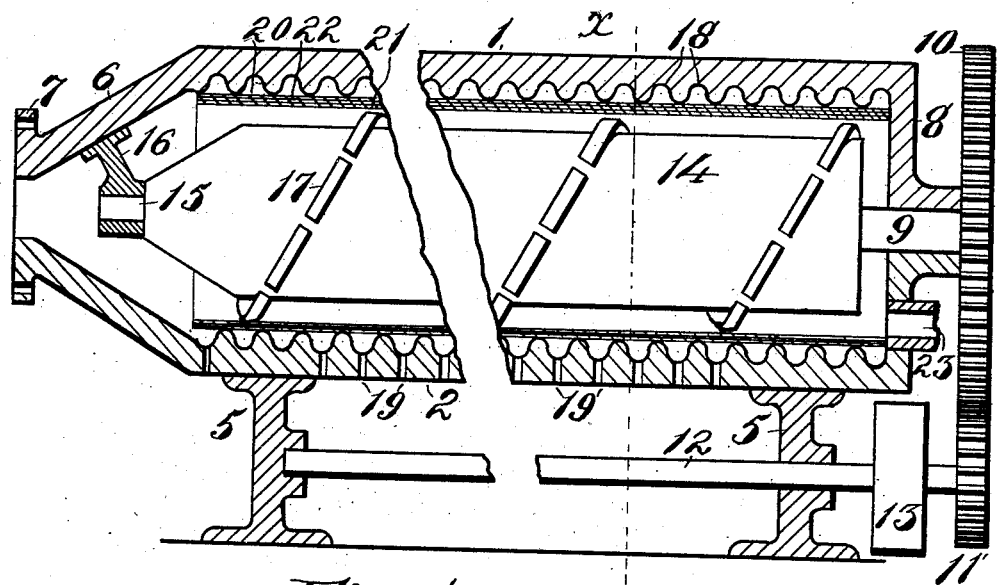
Figures 2, 3:
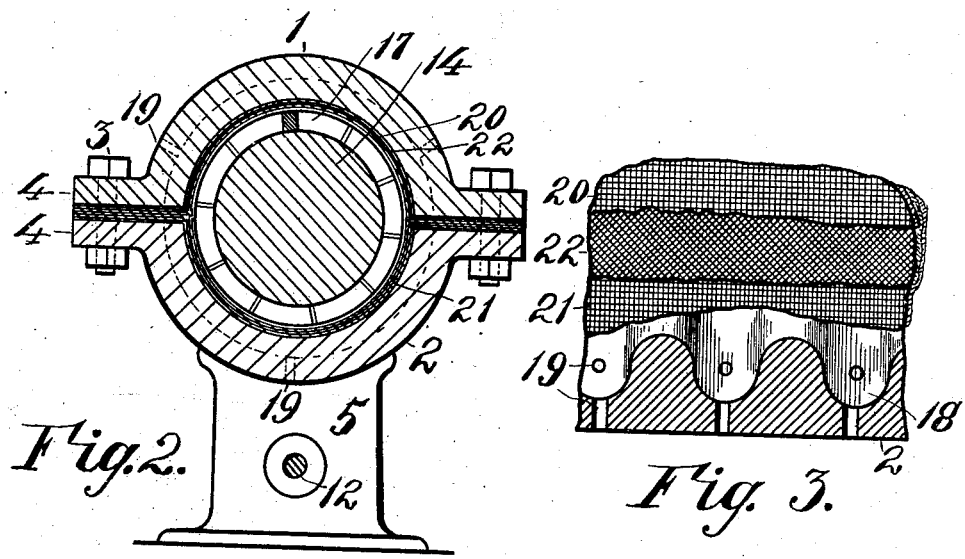

In the drawings, in which similar reference-numerals indicate like parts in the different figures, Figure 1 is a vertical longitudinal section of my improved device. Fig. 2 is a section on line *x* of Fig. 1, and Fig. 3 an enlarged detail of a portion of the shell or wall of the device.

In the drawings the reference-numerals 1 and 2 designate, respectively, the upper and lower halves of an elongated cylinder connected by a plurality of bolts 3, which pass through laterally-extending flanges 4 of the portions 1 and 2. The lower portion 2 of the cylinder is supported on suitable legs 5. This cylinder is inwardly coned at one end at the point designated in the drawings by the reference-numeral 6 and terminates in a flange 7, to which may be secured by bolts or other means any form of die which may be used to impart to the issuing product a suitable conformation; but as the die forms no part of this invention it is not shown in the drawings.

The rear end of the device is closed by a wall 8, through the central portion of which exists an opening for the reception of a shaft 9. This shaft bears on its outer end a large spur-gear 10, which is driven by a pinion-gear 11, mounted on a shaft 12, supported in bearings in the legs 5 and which is caused to revolve by means of a belt passing over a pulley 13, suitably mounted on this shaft 12. Mounted on the shaft 9 is a mandrel 14, which occupies the major portion of the space inclosed by the cylinder 1 2. The front end of the mandrel 14 is reduced and terminates in a cylindrical portion 15, suitably mounted in a bracket or spider 16, which serves to support this end of the mandrel 14 properly in position. The mandrel 14 is provided with a series of spirally-arranged blades or paddles 17, whose function is to mix and force forward through the cylinder any substance or material which may be placed therein. The inclination of these blades 17 is such as to force the material toward the opening in the flange 7. The interior of the cylinder is circumferentially corrugated or fluted, thereby forming a plurality of annular grooves 18. At suitable points the shell or wall of the cylinder is perforated by a number of openings 19, which connect with the bottoms of the grooves 18 for the purpose of permitting the escape of moisture which collects therein.

In order to separate the surplus moisture from the solution of clay and water which is introduced in the cylinder to be acted upon by this device, I place within the cylinder a screen or filtering device which is adapted to rest on the ridges, which exist between the grooves 18, so that the grooves 18 form beneath this screen or filter passage-ways for the ready escape of water which is forced from the solution. The screen or filter is preferably formed of two layers of foraminous material, such as wire-cloth, (designated in Fig. 3 by the reference-numerals 20 and 21,) and between which is placed some reticulated material, such as canvas, which is held in position by them. The reticulated substance *per se* acts mainly as the filter, while the two sheets of foraminous material serve to stiffen, support, and retain in position the reticulated sheet. These sheets of material constituting a filter are carried outwardly between the flanges 4 4 of the members 1 and 2 of the cylinder and are held from displacement by the bolts which clamp the two members of the cylinder together. The solution which is placed in the device for treatment is introduced from a suitable source of supply through an opening 23 by means of a powerful pump, which maintains or keeps up a pressure of about one hundred pounds. The revolution of the mandrel 14 is constantly maintained by the belt passing over the pulley 13, and the action of the blades 17 is to force the mixture forward toward the discharge end in the conical portion 6. The mixture is agitated by these blades, and the surplus water is forced outward through the sheets of foraminous and recticulated material and collects in the grooves 18, from which it escapes through the openings 19. The expressing of the surplus water is greatly aided by the excessive pressure used in the device. By the time the mixture reaches the conical portion 6 of the device the surplus moisture has been removed, and the clay issues from the narrow opening and passes through the die in a stiff, plastic, putty-like condition in a continuous stream of a definite size, which may be cut into sections of a predetermined length, which gives the necessary amount to be used in forming the articles for which this material is adapted.

What I claim, and desire to secure by Letters Patent, is—

1. The combination in a device of the class described, of a cylinder provided at one end with a contracted opening, a mandrel mounted in said cylinder provided with spirally-arranged members projecting therefrom, the interior of said cylinder being provided with a plurality of circumferential grooves having outlets and a layer of filtering material adapted to form a lining for said cylinder, means for retaining said lining in position and means for introducing to the interior of the cylinder a suitable matter in solution.

2. A device of the class described, comprising in combination an elongated cylinder provided with a contracted opening at one end, said cylinder being further provided with interiorly-arranged circumferential grooves having outlets connecting with said grooves, a lining for said cylinder consisting of a foraminous or reticulated substance, a mandrel mounted in said cylinder, a plurality of spirally-arranged blades on said mandrel, means for revolving said mandrel, and means for introducing to the interior of said cylinder a suitable material in solution.

3. A device of the class described, comprising in combination an elongated divided cylinder provided with a contracted opening at one end and further provided with interiorly-arranged circumferential grooves having outlets extending therefrom through the wall of said cylinder, a foraminous or reticulated lining for said cylinder adapted to be retained in position by being clamped between the contacting edges of the parts of said cylinder, a mandrel mounted for rotation in said cylinder, means for rotating said cylinder, and means carried by said mandrel for forcing material placed in said cylinder through the contracted opening in the end thereof and expressing the aqueous moisture through said lining.

4. A device of the class described, comprising a cylinder consisting of two semicylindrical body portions adapted to be fastened together, means for forcing material along the interior of said cylinder, said cylinder being provided with interiorly-arranged circumferential grooves having openings extending through the wall thereof, a lining therefor composed of a foraminous or reticulated material and means for introducing to the interior of the cylinder a suitable matter in solution.

In testimony whereof I have hereunto set my hand in presence of two subscribing witnesses.

THOMAS R. BRITTAIN.

Witnesses:
C. E. HUMPHREY,
GLENARA FOX.